US011023054B2

(12) United States Patent
Roberts

(10) Patent No.: US 11,023,054 B2
(45) Date of Patent: Jun. 1, 2021

(54) DEVICE CASE COMPUTER MOUSE

(71) Applicant: International Business Machines Corporation, Armonk, NY (US)

(72) Inventor: Richard Roberts, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/582,095

(22) Filed: Sep. 25, 2019

(65) Prior Publication Data

US 2021/0089144 A1 Mar. 25, 2021

(51) Int. Cl.
| | |
|---|---|
| *G06F 3/0354* | (2013.01) |
| *H04B 1/3827* | (2015.01) |
| *H02J 7/00* | (2006.01) |
| *G06F 3/038* | (2013.01) |
| *G06F 3/03* | (2006.01) |
| *G06F 1/16* | (2006.01) |

(52) U.S. Cl.
CPC ........ *G06F 3/03543* (2013.01); *G06F 1/1613* (2013.01); *G06F 3/0304* (2013.01); *G06F 3/038* (2013.01); *H02J 7/0042* (2013.01); *H04B 1/3827* (2013.01); *G06F 2203/0384* (2013.01)

(58) Field of Classification Search
CPC ...... G06F 1/1618; G06F 1/1669; G06F 1/169; G06F 1/1698; G06F 3/03543; G06F 3/038; G06F 2200/1614; G06F 2200/1632; G06F 2203/0333; G06F 2221/2153
See application file for complete search history.

(56) References Cited

U.S. PATENT DOCUMENTS

| | | | |
|---|---|---|---|
| 6,476,795 B1 * | 11/2002 | Derocher | G06F 1/1616 320/114 |
| 8,612,641 B1 | 12/2013 | Bozarth | |
| 8,614,885 B2 * | 12/2013 | Solomon | G06F 1/1632 312/223.1 |
| 2006/0152484 A1 * | 7/2006 | Rolus Borgward | G06F 3/03543 345/157 |
| 2014/0145955 A1 | 5/2014 | Gomez | |

FOREIGN PATENT DOCUMENTS

| | | |
|---|---|---|
| CN | 203104541 U | 7/2013 |
| GB | 2557285 A | 1/2017 |
| WO | 2016200117 A1 | 12/2016 |

* cited by examiner

*Primary Examiner* — Nelson M Rosario
(74) *Attorney, Agent, or Firm* — Grant M. McNeilly

(57) ABSTRACT

A device case computer mouse includes a body including a cavity configured to attach the device case to a handheld computer, a motion sensor connected to the body, a battery connected to the body, and a charging port connected to the body and electrically connected to the battery, the charging port being configured to be connected to a case charging cable. Also included is a processor electrically connected to the battery and communicatively connected to the motion sensor, wherein the processor is configured to be communicatively connected to the handheld computer wirelessly and to a portable computer to transmit motion data from the motion sensor to the portable computer and to transmit input data from the handheld computer to the portable computer.

20 Claims, 3 Drawing Sheets

DEVICE CASE COMPUTER MOUSE

BACKGROUND

The present invention relates to computer peripherals, and more specifically, to a device case that can be used as a computer mouse.

Portable computers, such as laptop computers, allow users to travel with full-power workstations from place to place and rapidly set up a workspace virtually wherever they desire. Laptop computers are oftentimes used with peripheral devices, for example, computer mice. At times, for example, within an office building, a portable computer is carried without the aid of a bag. In such a situation, the computer mouse that would typically accompany the portable computer can be difficult to carry and/or keep track of, so sometimes users will forgo bringing them, making the portable computer less user-friendly.

SUMMARY

According to some embodiments of the present disclosure, a device case computer mouse includes a body including a cavity configured to attach the device case to a handheld computer, a motion sensor connected to the body, a battery connected to the body, and a charging port connected to the body and electrically connected to the battery, the charging port being configured to be connected to a case charging cable. Also included is a processor electrically connected to the battery and communicatively connected to the motion sensor, wherein the processor is configured to be communicatively connected to the handheld computer wirelessly and to a portable computer to transmit motion data from the motion sensor to the portable computer and to transmit input data from the handheld computer to the portable computer.

According to some embodiments of the present disclosure, a computing system includes a portable computer, a handheld computer, and a case attached to the handheld computer, wherein the case is communicatively connected to the portable computer and is wirelessly communicatively connected to the handheld computer. The case includes a body, a motion sensor connected to the body, a battery connected to the body, and a processor electrically connected to the battery and communicatively connected to the motion sensor, wherein the processor is configured to transmit motion data from the motion sensor to the portable computer and to transmit input data from the handheld computer to the portable computer.

DETAILED DESCRIPTION

Figure 1:
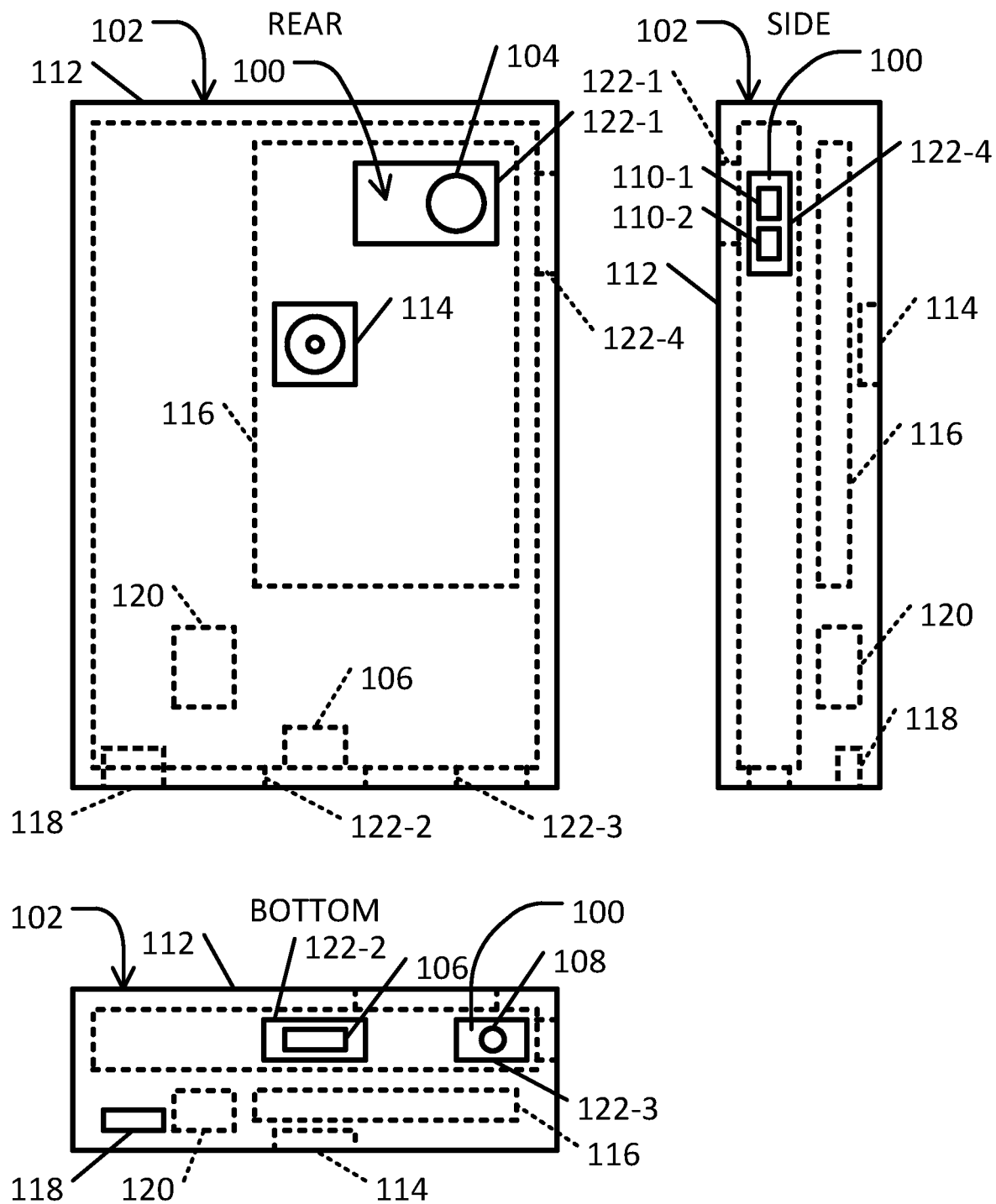
FIG. 1 is a multi-view (rear, side, bottom) of a device with a case according to an embodiment of the present disclosure.

FIG. 1 is a multi-view (rear, side, bottom) of device 100 with case 102 according to an embodiment of the present disclosure. Device 100 is a handheld computer such as, for example, a mobile phone, a calculator, or a personal digital assistant. Device 100 can include features for interacting with other components and/or the outside environment. For example, device 100 includes camera 104, connection port 106, input/output (I/O) port 108, and hard keys 110. In such an example, connection port 106 can be for charging and/or communicating with device 100, and I/O port 108 can be for receiving data from and/or inputting data to device 100 (such as for connecting to headphones for listening to sound with the ability to control volume thereof). Hard keys 110-1 and 110-2 (collectively "hard keys 110") can be used to control device 100, for example, to lock device 100 and/or adjust the volume of device 100.

In the illustrated embodiment, case 102 is attached to device 100, for example, by being comprised of an elastically deformable material (e.g., polymer) that can snap over and surrounds a significant portion of device 100, holding device 100 in a cavity in case 102. Case 102 includes body 112, motion sensor 114, battery 116, case port 118, and processor 120. Body 112 includes camera window 122-1, connection window 122-2, I/O window 122-3, key window 122-4, and screen window 122-5 (shown in FIG. 2) (collectively "windows 122"). Windows 122 allow access to and/or for features of device 100, such as camera 104, connection port 106, I/O port 108, and hard keys 110, respectively.

Motion sensor 114 is connected to body 112 and can be any suitable type of motion sensor. For example, motion sensor 114 can be an optical sensor, an accelerometer, an inertial sensor, and/or a roller ball. Battery 116 is connected to body 112 and provides power to motion sensor 114 and processor 120. Case port 118 is connected to body 112 and is electrically connected to battery 116 and processor 120. Processor 120 can be, for example, an integrated circuit or other computing device that controls the operation of and executes the communication for case 102.

Figure 2:
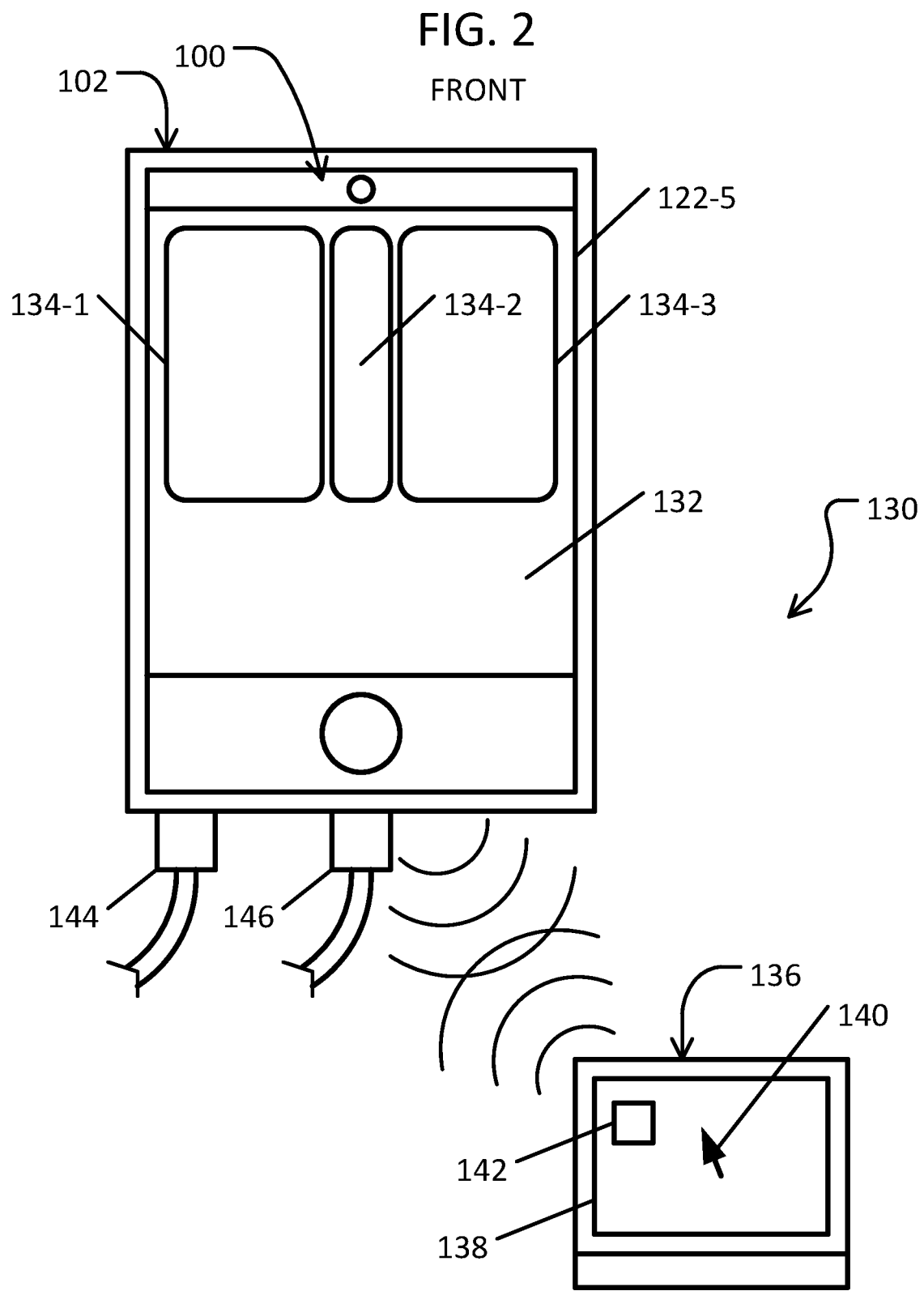
FIG. 2 is a front schematic view of a computing system including the device and the case according to an embodiment of the present disclosure.

The features of device 100 and case 102 are further described with respect to FIG. 2. FIG. 2 is a front schematic view of computing system 130 including device 100 and case 102 according to an embodiment of the present disclosure. As shown, device 100 includes screen 132, on which an application interface is displayed that includes right button 134-1, wheel 134-2, and left button 134-3 (collectively "soft keys 134"). The size, shape, position, and function of soft keys 134 can be configurable in the application, and soft keys 134 can be actuated through the touch screen capabilities of device 100. Similarly, the function of hard keys 110 can be configurable in the application. Thereby, a user (not shown) can interact with the application via soft keys 134 and/or hard keys 110 to issue commands that are communicated wirelessly as input data to processor 120. Furthermore, processor 120 gathers motion data from motion sensor 114. This input data and motion data can be communicated, for example, through a wired connection or wirelessly, from case 102 to portable computer 136.

In the illustrated embodiment, portable computer 136 is a component of computing system 130, such as, for example, a laptop computer or a tablet. Portable computer 136 includes display 138 on which a graphic user interface is displayed that includes cursor 140 and icon 142. The position of cursor 140 can be controlled by motion data from case 102, so changing the position of cursor 140 can be accomplished by the user moving case 102 along a surface. Additionally, features and functions of portable computer 136 can be controlled by input data from case 102. For example, if a user moves cursor 140 to icon 142, the user can press right button 134-1 to select icon 142. For another example, if user is utilizing an internet browser, pressing hard key 110-2 can cause the browser to go back to the previous page.

In addition, computing system 130 can include case charging cord 144 which is configured to connect to case port 118 of case 102. Thereby, battery 116 can be charged. Computing system 130 can further include device connection cord 146 which is configured to connect to connection port 106 on device 100. This is permitted by connection window 122-2, which allows access to connection port 106. Thereby, device 100 can be charged and/or communicated with.

The components, configuration, and operation of computing system 130 allow for a user to essentially use their device 100 as a computer mouse to interface with portable computer 136. This prevents user from having to take a separate computer mouse when traveling with portable computer 136. In addition, device 100 maintains its full functionality because windows 122 prevent case 102 from blocking functional areas of device 100.

Figure 3:
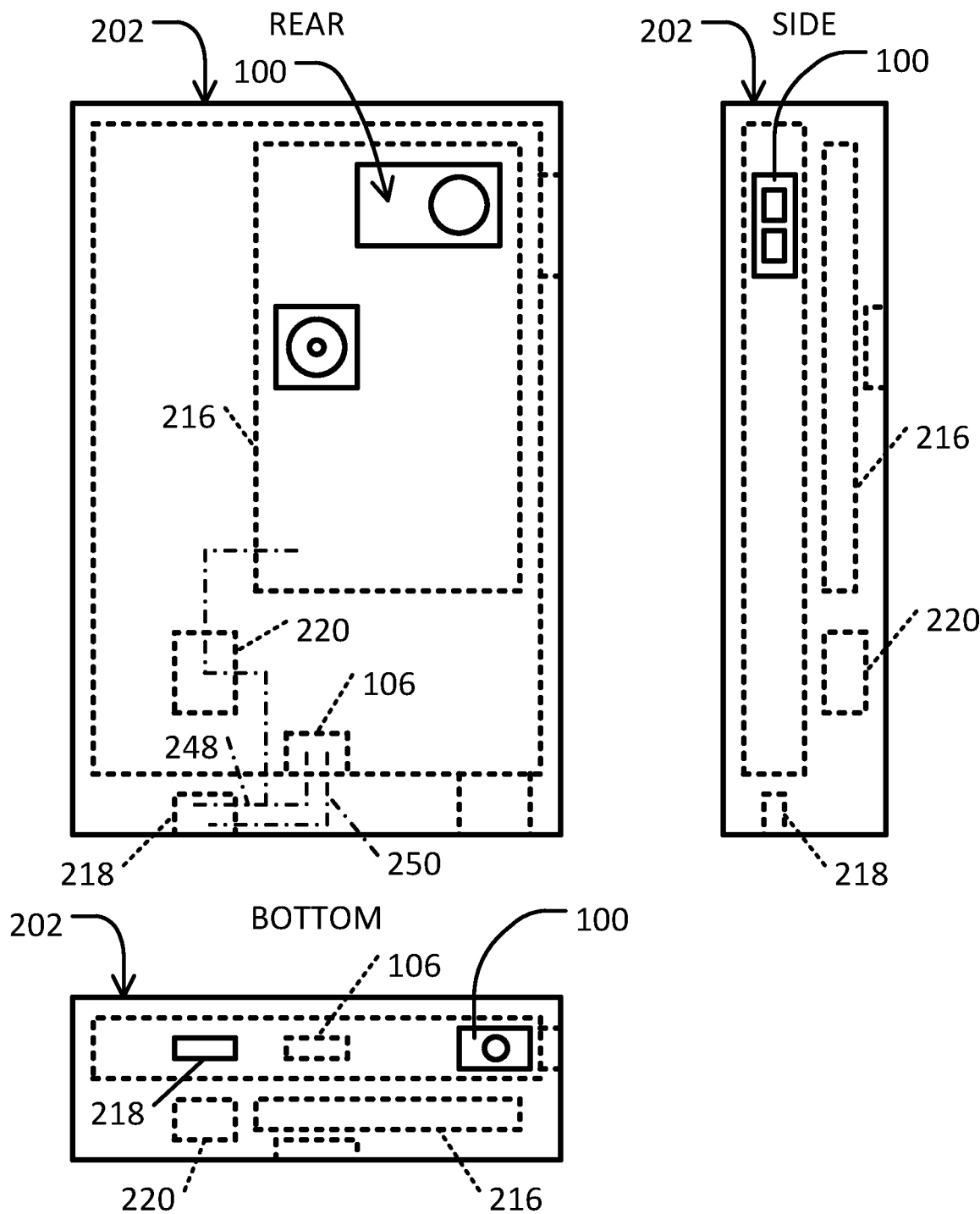
FIG. 3 is a multi-view (rear, side, bottom) of the device with an alternate embodiment case according to an embodiment of the present disclosure.

FIG. 3 is a multi-view (rear, side, bottom) of device 100 with an alternate embodiment case 202 according to an embodiment of the present disclosure. Case 202 can be similar to case 102 (shown in FIGS. 1 and 2), although with some differences. For example, case 202 lacks connector window 122-2, although case 202 includes case port 218.

In the illustrated embodiment, case port 218 is electrically connected to battery 216 and processor 220, as well as to connection port 106. More specifically, power lead 248 (which there can be more than one of) is electrically connected to battery 216/processor 220 and connection port 106. However, communication lead 250 (which there can be more than one of) runs directly to connection port 106 and is not electrically connected to battery 216/processor 220. Thereby, case 202 communicates with device 100 wirelessly, although only one case/device cord (not shown) is required to charge case 202 and charge/communicate with device 100. This is an advantage over the configuration of case 102, although it may mean that case 202 is larger than case 102 due to device 102 plugging into case 202 at connection port 106.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device case computer mouse comprising:
   a body including a cavity configured to attach the device case to a handheld computer;
   a motion sensor directly connected to the body on an exterior surface of the body such that the motion sensor can sense the movement of the body over a surface;
   a battery connected to the body;
   a charging port connected to the body and electrically connected to the battery, the charging port being configured to be connected to a case charging cable; and
   a processor electrically connected to the battery and communicatively connected to the motion sensor, wherein the processor is configured to be communicatively connected to the handheld computer wirelessly and to a portable computer to transmit motion data from the motion sensor to the portable computer and to transmit input data from the handheld computer to the portable computer.

2. The device case of claim 1, wherein the motion sensor is an optical sensor.

3. The device case of claim 1, wherein the processor is communicatively coupled with an application on the handheld computer that generates the input data.

4. The device case of claim 3, wherein the application receives signals from a soft key on a screen of the handheld computer.

5. The device case of claim 3, wherein the application receives signals from a hard key of the handheld computer.

6. The device case of claim 1, wherein the charging port is further configured to be electrically connected to the handheld computer such that the case charging cable is used to charge the battery and the handheld computer.

7. The device case of claim 1, wherein the case further comprises a charging window around a connection port of the handheld computer to allow a computer charging cable to be connected to the handheld computer.

8. The device case of claim 1, wherein the case further comprises an input/output window around an input/output port of the handheld computer.

9. A computing system comprising:
   a portable computer;
   a handheld computer; and
   a case attached to the handheld computer, wherein the case is communicatively connected to the portable computer and is wirelessly communicatively connected to the handheld computer, wherein the case comprises:
   a body;
   a motion sensor directly connected to the body on an exterior surface of the body such that the motion sensor can sense the movement of the body over a surface;
   a battery connected to the body; and
   a processor electrically connected to the battery and communicatively connected to the motion sensor, wherein the processor is configured to transmit motion data from the motion sensor to the portable computer and to transmit input data from the handheld computer to the portable computer.

10. The computing system of claim 9, wherein the case is wirelessly communicatively connected to the portable computer.

11. The computing system of claim 9, wherein the handheld computer is a mobile phone.

12. The computing system of claim 9, wherein the portable computer is a laptop computer.

13. The computing system of claim 9, wherein the processor is communicatively coupled with an application on the handheld computer that generates the input data.

14. The computing system of claim 13, wherein the application receives signals from a soft key on a screen of the handheld computer.

15. The computing system of claim 13, wherein the application receives signals from a hard key of the handheld computer.

16. The computing system of claim 9, wherein the motion sensor is an optical sensor.

17. The computing system of claim 9, wherein the case further comprises a charging port connected to the body and electrically connected to the battery, the charging port being configured to be connected to a case charging cable to charge the battery.

18. The computing system of claim 17, wherein the charging port is further electrically connected to the handheld computer such that the case charging cable can be connected to the charging port to charge the battery and the handheld computer.

19. The computing system of claim 17, wherein the case further comprises a charging window around a connection port of the handheld computer to allow a computer connection cable to be connected to the handheld computer.

20. The computing system of claim 9, wherein the case further comprises an input/output window around an input/output port of the handheld computer.

* * * * *